(12) United States Patent
Han et al.

(10) Patent No.: US 7,674,542 B2
(45) Date of Patent: Mar. 9, 2010

(54) FUEL CELL SYSTEM

(75) Inventors: Kyu-Nam Han, Suwon-si (KR);
Dong-Hun Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 1375 days.

(21) Appl. No.: 11/054,002

(22) Filed: Feb. 8, 2005

(65) Prior Publication Data

US 2005/0181251 A1 Aug. 18, 2005

(30) Foreign Application Priority Data

Feb. 13, 2004 (KR) ............ 10-2004-0009472

(51) Int. Cl.
*H01M 8/04* (2006.01)
*H01M 8/10* (2006.01)
*F22B 37/12* (2006.01)

(52) U.S. Cl. .................. 429/26; 429/30; 122/242

(58) Field of Classification Search ........... 122/242, 122/366
See application file for complete search history.

(56) References Cited

U.S. PATENT DOCUMENTS 4,226,829 A * 10/1980 Mike ................... 422/123

| | | | |
|---|---|---|---|
| 2002/0092916 A1 * | 7/2002 | Gaarder et al. | 237/12.3 R |
| 2003/0012990 A1 * | 1/2003 | Yamanashi | 429/24 |
| 2003/0159809 A1 * | 8/2003 | Valenzuela | 165/104.26 |
| 2003/0190502 A1 | 10/2003 | Illner et al. | |
| 2004/0151598 A1 * | 8/2004 | Young et al. | 417/208 |

FOREIGN PATENT DOCUMENTS

| JP | 4-58464 | 2/1992 |
|---|---|---|
| JP | 09-213359 | 8/1997 |
| JP | 2003-86208 | 3/2003 |
| JP | 2003-297401 | 10/2003 |

OTHER PUBLICATIONS

Patent Abstracts of Japan, Publication No. 04-058464, dated Feb. 25, 1992, in the name of Isamu Osawa.
Patent Abstracts of Japan for Publication No. 2003-086208; Date of publication of application: Mar. 20, 2003, in the name of Yasutada Takagi et al.

* cited by examiner

*Primary Examiner*—Dah-Wei D Yuan
*Assistant Examiner*—Maria J Laios
(74) *Attorney, Agent, or Firm*—Christie, Parker & Hale, LLP

(57) ABSTRACT

A fuel cell system includes a stack for generating electricity through an electrochemical reaction between hydrogen and oxygen, a fuel supply unit for supplying fuel to the stack, an air supply unit for supplying air to the stack, and a vaporizing unit connected with the stack and for vaporizing moisture discharged from the stack.

17 Claims, 4 Drawing Sheets

FUEL CELL SYSTEM

CROSS-REFERENCE TO RELATED APPLICATION

This application claims the benefit of and priority to Korean Patent Application No. 10-2004-0009472, filed on Feb. 13, 2004 in the Korean Intellectual Property Office, the entire disclosure of which is incorporated herein by reference.

FIELD OF THE INVENTION

The present invention relates to a fuel cell system, and more particularly, to a structure of a fuel cell system for treating moisture discharged from a stack.

BACKGROUND OF THE INVENTION

A fuel cell is generally known as an electricity generating system which directly converts chemical energy into electric energy through an electrochemical reaction between oxygen, or air containing the oxygen, and hydrogen contained in hydrocarbon-grouped material such as methanol and natural gas. Specifically, the fuel cell has a feature that it can produce electricity generated through the electrochemical reaction between hydrogen and oxygen without combustion and provides heat as a byproduct thereof that can be used simultaneously.

Fuel cells are classified into a phosphate (or phosphoric-acid) fuel cell working at a temperature of about 150° C. to 200° C., a molten carbonate fuel cell working at a high temperature of about 600° C. to 700° C., a solid oxide fuel cell working at a high temperature of 1,000° C. or more, and a polymer electrolyte membrane fuel cell (PEMFC) and an alkali fuel cell working at a room temperature or a temperature of 100° C. or less, depending upon kinds of used electrolyte. These fuel cells work basically on the same principle, but are different from one another in kind of fuel, operating temperature, catalyst, and electrolyte.

The recently developed PEMFC has an excellent output characteristic, a low operating temperature, and a fast starting and response characteristic as compared to other fuel cells, and uses hydrogen obtained by reforming methanol, ethanol, natural gas, etc. Accordingly, the PEMFC has a wide range of applications such as a mobile power source for vehicles, a distributed power source for the home or buildings, and a small-sized power source for electronic devices.

The aforementioned PEMFC has a fuel cell main body (hereinafter, referred to as a stack), a fuel tank, and a fuel pump supplying fuel to the stack from the fuel tank to constitute a typical system. Such a fuel cell further includes a reformer for reforming the fuel to generate hydrogen gas and supplying the hydrogen gas to the stack. Therefore, in the PEMFC, the fuel stored in the fuel tank is supplied to the reformer by means of a pumping power of the fuel pump. The reformer then reforms the fuel to generate the hydrogen gas. The stack makes the hydrogen gas and oxygen to electrochemically react with each other, thereby generating electric energy.

Alternatively, such a fuel cell can employ a direct methanol fuel cell (DMFC) scheme to directly supply liquid fuel containing hydrogen to the stack and to generate electricity. The fuel cell employing the DMFC scheme does not require the reformer, unlike the PEMFC.

In the fuel cell system described above, the stack substantially generating the electricity has a stacked structure of several or several tens unit cells having a membrane-electrode assembly (MEA) and a separator (or a bipolar plate). The MEA has a structure in which an anode electrode and a cathode electrode are bonded to each other with an electrolyte membrane therebetween. The separator simultaneously performs a function of a passage through which oxygen and hydrogen gas required for the reaction of the fuel cell are supplied and a function of a conductor connecting in series the anode electrode and the cathode electrode of each MEA to each other.

Therefore, through the separator, hydrogen gas is supplied to the anode electrode and oxygen (or air containing the oxygen) is supplied to the cathode electrode. An oxidation reaction of the hydrogen gas takes place in the anode electrode and a reduction reaction of oxygen takes place in the cathode electrode. Due to movement of electrons generated at that time, electricity, heat, and water can be collectively obtained.

Here, some of the air supplied to the cathode of the MEA through the separator participates in the reaction, and the other air not participating in the reaction is discharged. The discharged air contains a large quantity of moisture generated at the time of generating the electricity in the conventional fuel cell system, when the non-reacted (or non-participating) air containing a large quantity of moisture is directly discharged into the atmosphere at a relatively low temperature, the non-reacted air contacts the atmosphere and its contained moisture is thus condensed.

As a result, the conventional fuel cell system needs to further include an additional unit for storing or recycling water generated while the non-reacted air's moisture is condensed. Therefore, it is not possible to make the size of the entire system compact, and a heat or an electric load due to the operation of the additional unit is further applied to the system to deteriorate the efficiency and performance thereof.

SUMMARY OF THE INVENTION

The present invention provides a fuel cell system having a structure capable of vaporizing moisture contained in the non-reacted air discharged from a stack and exhausting the vaporized moisture to the outside.

According to one exemplary embodiment of the present invention, a fuel cell system is provided. The fuel cell system includes: a stack for generating electric energy through an electrochemical reaction between hydrogen and oxygen, a fuel supply unit for supplying fuel to the stack, an air supply unit for supplying air to the stack, and a vaporizing unit connected with the stack and for vaporizing moisture discharged from the stack.

The vaporizing unit may be made of a porous member absorbing the moisture by a capillary action.

The vaporizing unit may include a main body and a capillary channel formed in the main body. The capillary channel may have an entrance and communicates with the entrance.

A plurality of capillary channels may be formed in the main body and the exits of the capillary channels may form one grooved exit.

The main body in which the plurality of exits is formed may include a groove connecting the exits to form the one grooved exit.

At least one of the capillary channels may include a first region having a first region passage that is gradually narrowed from the entrance of the at least one of the capillary channels to the exit of the at least one of the capillary channels and a second region which extends from the first region and having a second passage region that is gradually expanded from the first region to the exit of the at least one of the capillary channels.

The fuel cell system may further include a heater connected to the main body and heating an area around the exit of at least one of the capillary channels.

The heater may be provided in a portion of the main body corresponding to the second region.

The stack and the vaporizing unit may be connected to each other through a flow channel disposed therebetween.

The fuel supply unit may include a fuel tank for storing the fuel and a fuel pump connected to the fuel tank.

The air supply unit may include an air pump for sucking external air.

A reformer for reforming the fuel supplied from the fuel supply unit to generate gas containing hydrogen may be disposed between the fuel supply unit and the stack and be connected to the fuel supply unit and the stack.

The fuel cell system may employ a polymer electrolyte membrane fuel cell (PEMFC) scheme or a direct methanol fuel cell (DMFC) scheme.

DETAILED DESCRIPTION

An exemplary embodiment of a fuel cell system according to the present invention employs a polymer electrode membrane fuel cell (PEMFC) scheme in which hydrogen gas is generated by reforming fuel containing hydrogen and the chemical energy generated by allowing the hydrogen gas and oxygen to electrochemically react with each other is directly converted into electric energy.

Further, an exemplary embodiment of a fuel cell system according to the present invention may employ a direct methanol fuel cell (DMFC) scheme in which liquid fuel is directly supplied to a stack.

Hereinafter, an exemplary embodiment of a fuel cell system employing the PEMFC scheme will be described for exemplary purposes only and the invention is not thereby limited. In this exemplary embodiment, the fuel for generating electricity includes water and oxygen in addition to hydrocarbon-grouped or alcohol-grouped fuels such as methanol, ethanol, and/or natural gas. In the descriptions to be described below, liquid fuel is referred to as a hydrocarbon-grouped or alcohol-grouped fuel or a mixed fuel which is a mixture of the hydrocarbon-grouped or alcohol-grouped fuel and water. Further, as the oxygen fuel, pure oxygen gas stored in an additional storing unit may be used, or air containing oxygen may be used as is. Hereinafter, an exemplary embodiment of a fuel cell system in which external air is used as the oxygen fuel will be described.

Figure 1:
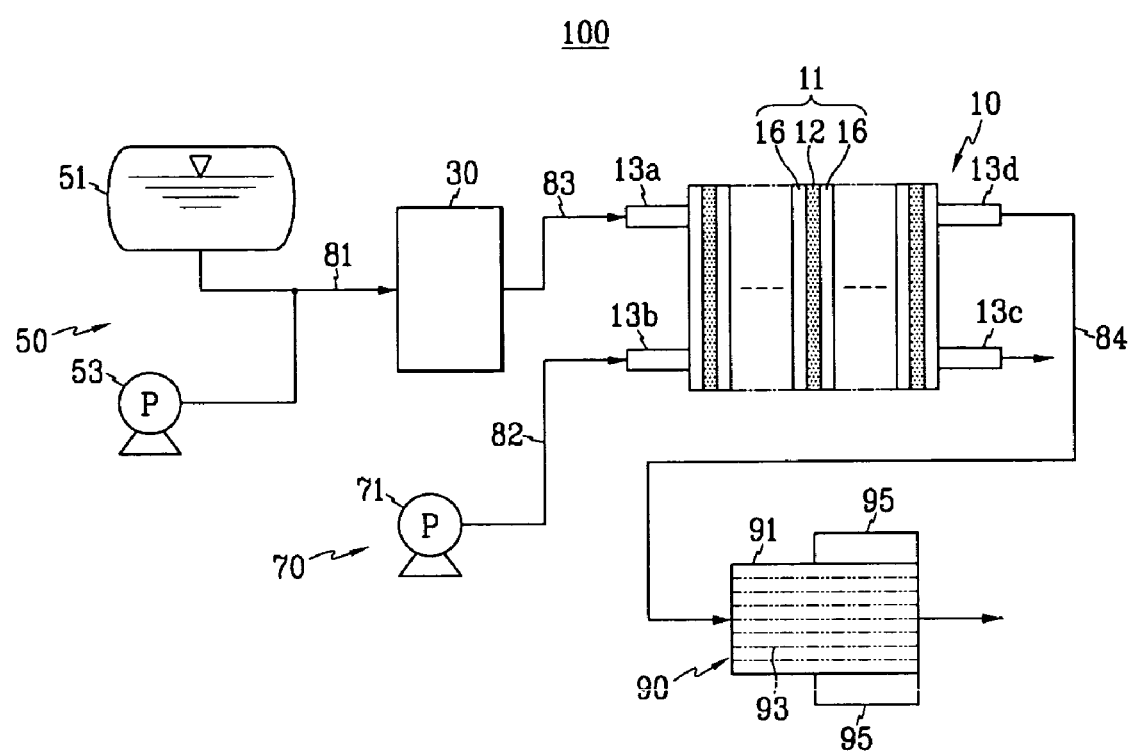
FIG. 1 is a schematic diagram illustrating a fuel cell system according to an embodiment of the present invention.

Referring now to FIG. 1, a fuel cell system 100 according to an embodiment of the present invention includes a reformer 30 which reforms liquid fuel to generate hydrogen. A stack 10 converts the chemical reaction energy between the gas (or hydrogen) generated from the reformer 30 and external air into electric energy to generate electricity. A fuel supply unit 50 supplies the liquid fuel to the reformer 30. An air supply unit 70 supplies external air to the stack 10.

The reformer 30 converts the liquid fuel into hydrogen gas needed for electricity generation through the reforming reaction, and removes carbon monoxide contained with the hydrogen gas. Generally, the reformer 30 includes a reforming part for reforming the liquid fuel to generate the hydrogen gas, and a carbon monoxide removing part for removing the carbon monoxide from the hydrogen gas. The reforming part converts the fuel into reformed gas abundant in hydrogen through a catalytic reaction such as a vapor reformation, a partial oxidation, or an autothermal reaction. The carbon monoxide removing part removes the carbon monoxide from the reformed gas through a catalytic reaction such as a water-gas shift reaction and a preferential CO oxidation, or a method of refining hydrogen using a separating membrane.

The fuel supply unit 50 is connected to the reformer 30 and includes a fuel tank 51 for storing the fuel, and a fuel pump 53 connected to the fuel tank 51. The fuel supply unit 50 and the reformer 30 may be connected with each other through a first supply line 81.

The air supply unit 70 is connected to the stack 10, and includes an air pump 71 for sucking external air by a predetermined pumping power. The stack 10 and the air supply unit 70 may be connected through a second supply unit 82.

Figure 2:
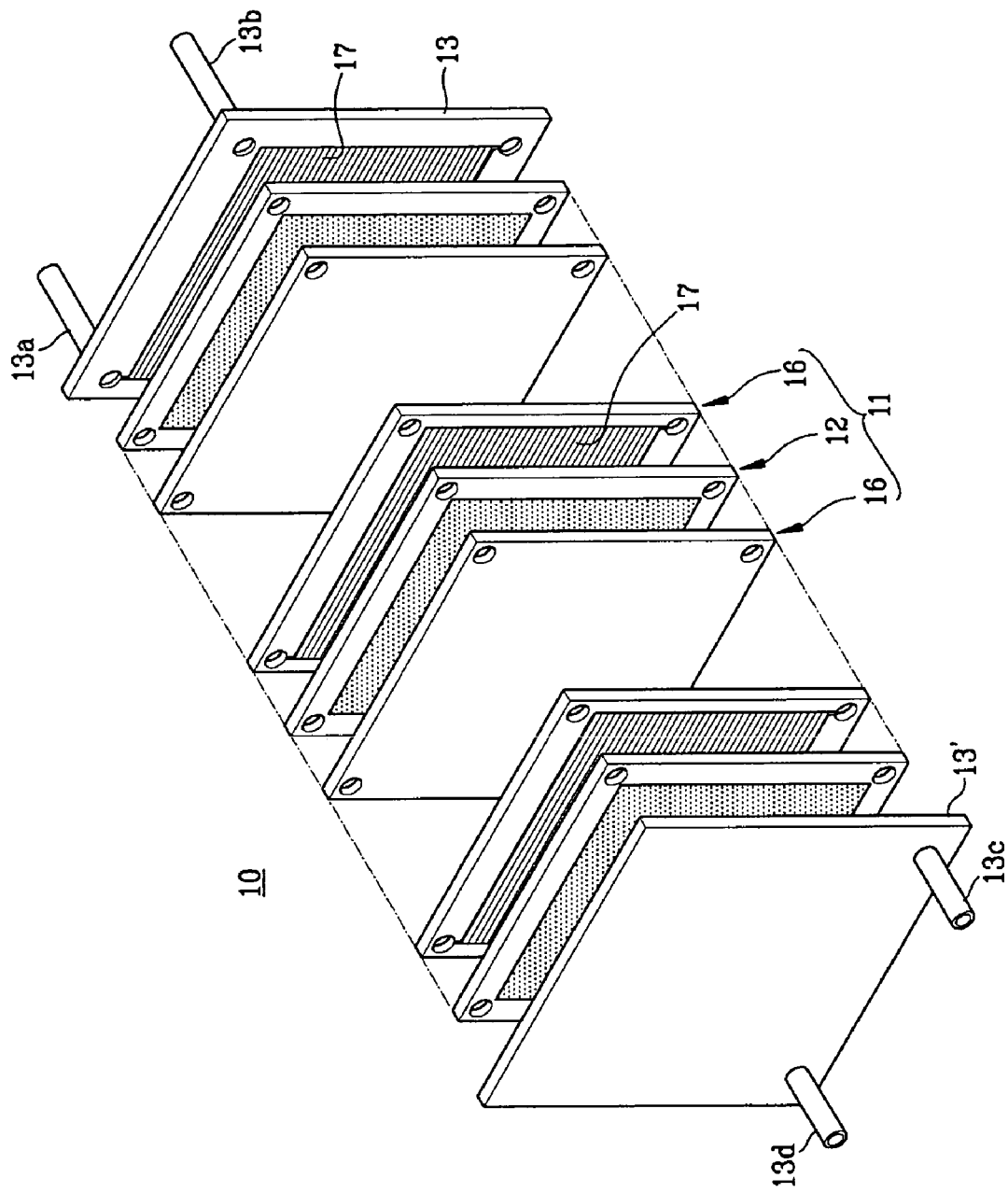
FIG. 2 is an exploded perspective view illustrating a stack shown in FIG. 1.

FIG. 2 is an exploded perspective view illustrating a structure of the stack 10 shown in FIG. 1

Referring to FIGS. 1 and 2, the stack 10 used in the fuel cell system 100 includes multiple electricity generators 11 which, to generate electric energy, induce an oxidation/reduction reaction between the hydrogen gas reformed by the reformer 30 and external air.

Each electricity generator 11 constitutes a unit cell for generating electricity, and includes a membrane electrode assembly (MEA) 12 for oxidizing/reducing the hydrogen gas and oxygen contained in the air, and separators 16 for supplying the hydrogen gas and air into the MEA 12. In each electricity generator 11, the MEA 12 is disposed at a central position and the separators 16 are disposed on both surfaces of the MEA 12, respectively.

The stack 10 is formed by continuously stacking electricity generators 11. An input end plate 13 and an output endplate 13' are disposed at both ends of the stack 10 and are for supporting the electricity generators 11 by fixing them into the stack 10.

The MEA 12 has a structure in which an anode electrode and a cathode electrode are disposed on both surfaces of an electrolyte membrane of the MEA 12 includes a catalytic layer for converting the hydrogen gas into electrons and hydrogen ions (or positive ions or protons) through an oxidization reaction and a gas diffusing layer (GDL) for smoothly moving the electrons and the hydrogen ions. The cathode electrode is supplied with the air through the separator 16, and includes a catalytic layer for converting oxygen contained in the air into electrons and oxygen ions through a reduction reaction and a gas diffusing layer for smoothly moving the electrons and the oxygen ions. The electrolytic membrane is made of solid polymer electrolyte with a thickness of about 50 to 200 μm, and has an ion exchanging function of moving the hydrogen ions generated at the catalytic layer of the anode electrode to the catalytic layer of the cathode electrode.

The separator 16 has a function of a conductor connecting in series the anode electrode and the cathode electrode of the MEA 12 to each other. Further, the separator 16 has a function of a passage providing the hydrogen gas and the air required for the oxidizing/reducing reaction of the MEA 12 into the anode electrode and the cathode electrode. Flow channels 17 supplying the gas required for the oxidization/reduction reaction of the MEA 12 are formed at the surfaces of the separators 16.

Specifically, the separators 16 are disposed at both surfaces of the MEA 12 with the MEA 16 interposed therebetween and are in close contact with the anode electrode and the cathode electrode of the MEA 12. The flow channels 17 for supplying the hydrogen gas to the anode electrode and for supplying the air to the cathode electrode are formed in the surfaces of the separators 16 coming in close contact with the anode electrode and cathode electrode of the MEA 12.

The respective end plates 13 and 13' are disposed on the outermost surfaces of the stack 10 and can also serve as a separator (bipolar plate) 16 (beside being used for compressing the electricity generators together). The respective end plates 13 and 13' are in close contact with either the anode electrode or the cathode electrode of the MEA 12. The flow channels 17 supplying either the hydrogen gas or air to any one of the electrodes are formed on the surface of the end plate 13 or 13' which is in close contact with the MEA 12.

In particular, the end plate 13 includes a first supply pipe 13a for supplying hydrogen gas generated from the reformer 30 into one flow channel 17 of the separator 16 and a second supply pipe 13b for injecting the air into the other flow channel 17. The end plate 13' has a first discharge pipe 13c for discharging hydrogen gas not participating in the reaction and finally remaining in the plural electricity generators 11, and a second discharge pipe 13d for discharging the non-reacted air finally remaining in the plural electricity generators 11 and moisture generated at the time of generating the electricity. Referring more specifically to FIG. 1, the first supply pipe 13a of the end plate 13 and the reformer 30 can be connected with each other through a third supply line 83. The second supply pipe 13b of the end plate 13 and the air supply unit 70 can be connected with each other through the aforementioned second supply line 82.

When the fuel cell system 100 having the aforementioned structure operates, some of the air supplied to the stack 10 participates in the reaction for generating electricity, and the other air not participating in the reaction (or the non-reacted air) is discharged through the second discharge pipe 13d of end plate 13' with a large quantity of moisture generated at the time of generating electricity. At this time, when the non-reacted air discharged from the second discharge pipe 13d of the stack 10 (that is, the air containing a large quantity of moisture is discharged to the atmosphere at a relatively low temperature), the moisture of the non-reacted air contacts the atmosphere and is condensed.

However, according to the exemplary embodiment of the present invention, the fuel cell system 100 includes a vaporizing unit 90 capable of vaporizing the moisture of the non-reacted air discharged from the discharge pipe 13d at the time of generating electricity by the stack 10, and externally discharging the vaporized moisture of the non-reacted air.

Figure 3:
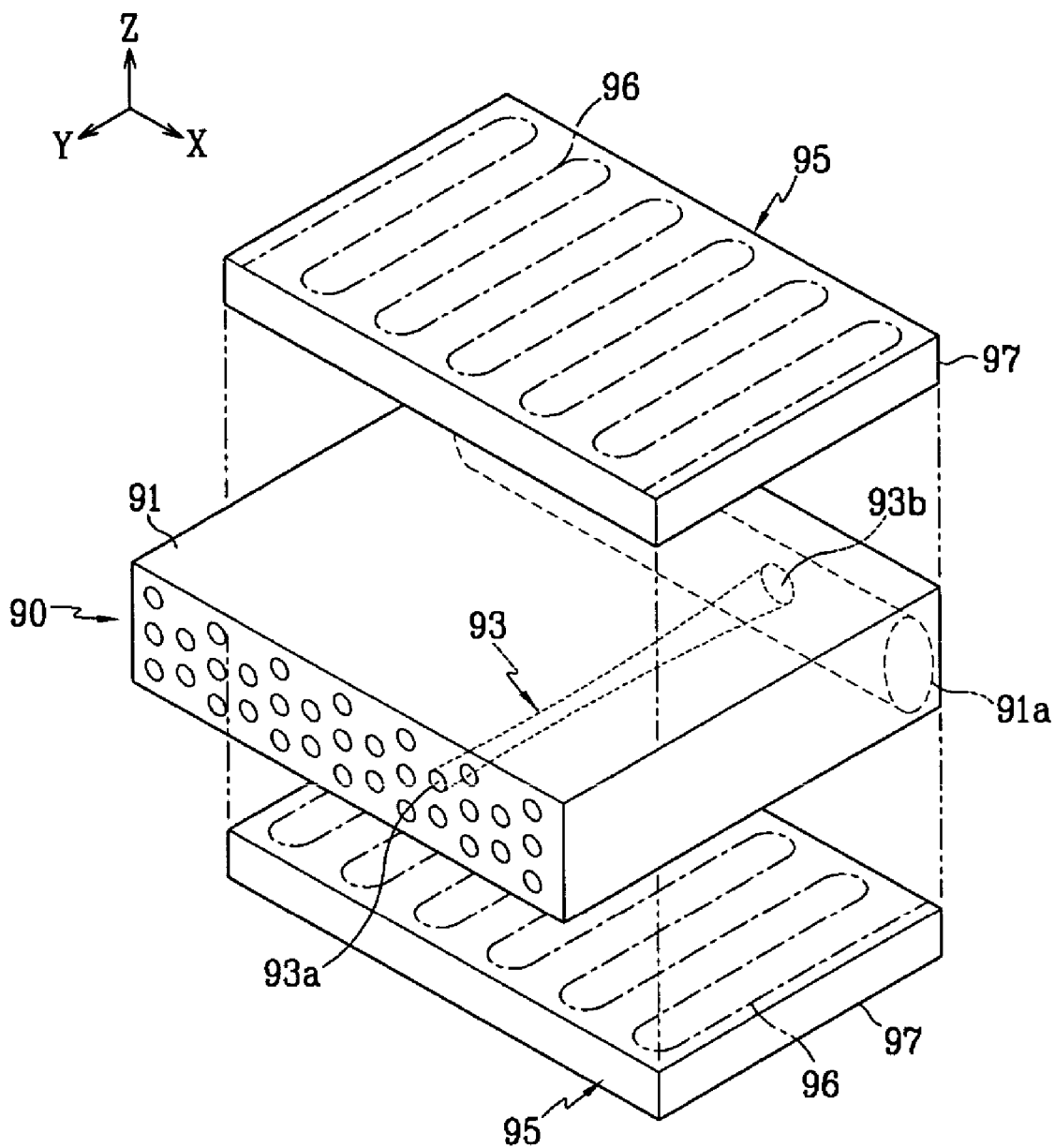
FIG. 3 is an exploded perspective view schematically illustrating a vaporizing unit shown in FIG. 1.
Figure 4:
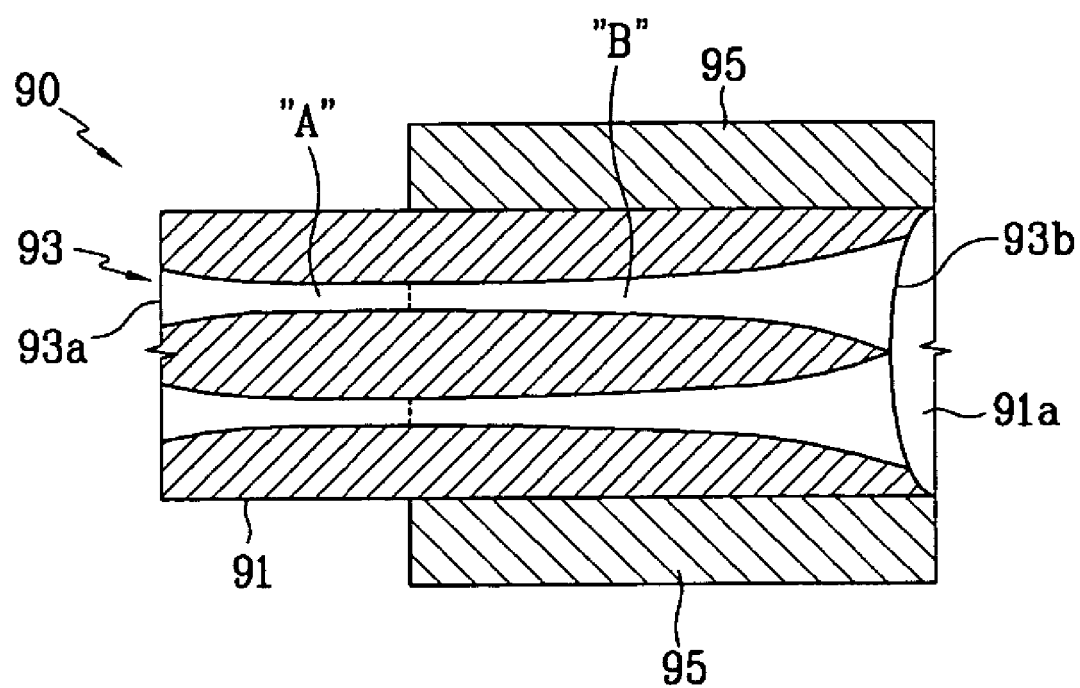
FIG. 4 is a sectional view illustrating a combined structure of FIG. 3.

FIG. 3 is an exploded perspective view schematically illustrating the structure of the vaporizing unit 90 shown in FIG. 1 according to the exemplary embodiment of the present invention. FIG. 4 is a sectional view illustrating a combined structure of FIG. 3 according to the exemplary embodiment of the present invention.

Referring to FIGS. 1 to 4, the vaporizing unit 90 has a structure in which the moisture contained in the non-reacted air discharged from the stack 10 can flow through the vaporizing unit 90 by capillary action and osmotic action, and the moisture can be discharged to the outside in the state where the moisture is vaporized by a predetermined heat source.

The vaporizing unit 90 includes a main body 91 and a capillary channel 93 formed in the main body with an entrance 93a and an exit 93b which communicates with the entrance 93a.

The main body 91 can be mounted on an external case of a mobile electric instrument or a mobile phone. The main body 91 may have a substantially rectangular plate shape having the predetermined length, width, and thickness, and may be made of porous metal with heat conductivity. The mounting portion (not shown) of the external case on which the main body 91 is mounted may have a plurality of vent holes for discharging the gas vaporized by the vaporizing unit 90 to the outside of the external case.

The capillary channel 93 is a fluid moving passage through which the non-reacted air discharged from the second discharge pipe 13d of the stack 10 (containing a large quantity of moisture) flows, and is formed at the inside of the main body 91 along a longitudinal direction (a Y-axis direction in FIG. 3) thereof. In the capillary channel 93, the entrance 93a is formed at the left of FIG. 3t on the basis of the width direction (the X-axis direction in FIG. 3), and the exit 93b communicating with the entrance 93a is formed at the right of FIG. 3. In the exemplary embodiment according to the present invention, multiple capillary channels 93 are formed in the main body 91.

Referring more specifically to FIGS. 1 and 4, each capillary channel 93 includes a first region A whose passage is gradually narrowed from the entrance 93a side to the exit 93b side and a second region B which extends from the first region A and whose passage is gradually expanded to the exit 93b side. Here, the entrance 93a can communicate with the second discharge pipe 13d of the stack 10 through a fourth supply line 84.

The multiple exits 93b of the respective capillary channels 93 are connected to a groove 91a formed on a side surface of the main body 91 in which the exits 93b are disposed, and communicate with each other. The exits 93b also communicate with a through-hole (not shown) of the external case. Further, an aromatic material (not shown) may be applied to an internal surface of the capillary channel 93.

In operation and accordance to the structure of the vaporizing unit 90, the non-reacted air discharged from the second discharge pipe 13d of the stack 10 (containing a large quantity of moisture) is supplied to the first region A through the porous entrance 93a by a capillary action, flows through the second region B, and is discharged from the exits 93b of the capillary channels 93. As a result, when the non-reacted air containing moisture of a relatively high temperature is discharged from the exits 93b, the exits 93b are larger in diameter than the entrances 93a and communicate with the through-hole, so that the temperature of the non-reacted air decreases through contact with the external air, and the quantity of the air which can contain the moisture of the non-reacted air rapidly increases. Therefore, it is possible to discharge the non-reacted air through the through-hole in a gaseous state (as compared to a condensed state).

Further, the vaporizing unit 90 may include heaters 95 for heating the main body 91. The heaters 95 may be disposed on the upper and lower surfaces of the main body 91 corresponding to the second region B of the capillary channel 93. The heater 95 includes a heating plate 97 in which hot-wires 96 connected to a predetermined power source (not shown) is built-in. When the body 91 corresponding to the second region B is heated and the non-reacted air flowing through the second region B from the first region A by the capillary action is vaporized, the heater 95 has a function of accelerating the vaporization.

In the present invention, the heaters 95 are disposed at the upper and lower surfaces of the main body 91 corresponding to the second region B of the capillary channel 93, respectively. However, the present invention is not limited thereto, but the heaters 95 may be, in the longitudinal direction of the main body 91, disposed on both side surfaces of the main body 91 corresponding to the second region B of the capillary channel 93, respectively. Furthermore, the heaters 95 may be disposed on the upper and lower surfaces and both side surfaces of the main body 91 corresponding to the second region B of the capillary channel 93, respectively.

Operations of the fuel cell system according to the exemplary embodiment of the present invention having the aforementioned structure will be described in more detail below.

First, the fuel pump 53 supplies the liquid fuel stored in the fuel tank 51 to the reformer 30 through the first supply line 81. At this time, the reformer 30 generates the hydrogen gas from the fuel through a steam reformer (SR) catalytic reaction and decreases the concentration of carbon monoxide contained in the hydrogen gas through a water-gas shift (WGS) catalytic reaction or a preferential CO oxidation (PROX) catalytic reaction.

Then, the hydrogen gas in which the concentration of carbon monoxide has decreased is supplied from the reformer 30 to the first supply pipe 13a through the third supply line 83. At this time, the hydrogen gas is supplied to the anode electrode of the MEA 12 through the separator 16.

At the same time, the air pump 71 supplies the external air to the second supply tube 13b of the stack 10 through the second supply line 82. At this time, the external air is supplied to the cathode electrode of the MEA 12 through the separator 16.

Therefore, when supplied with the hydrogen gas through the first supply pipe 13a and supplied with the external air through the second supply pipe 13b, the stack 10 generates electricity, heat, and water in accordance with the following chemical reactions.

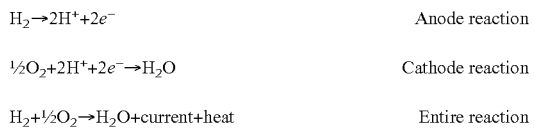

| | |
|---|---|
| $H_2 \rightarrow 2H^+ + 2e^-$ | Anode reaction |
| $\frac{1}{2}O_2 + 2H^+ + 2e^- \rightarrow H_2O$ | Cathode reaction |
| $H_2 + \frac{1}{2}O_2 \rightarrow H_2O + \text{current} + \text{heat}$ | Entire reaction |

Referring to the chemical reactions, the hydrogen gas is supplied to the anode of the MEA 12 through the separator 16, and the air is supplied to the cathode. When the hydrogen gas flows through the anode, hydrogen is catalytically converted into electrons and protons (hydrogen ions) by the catalytic layer. When the protons pass through the electrolyte membrane, electrons, oxygen ions, and the protons are synthesized to generate water with the help of catalyst. The electrons generated from the anode cannot pass through the electrolyte membrane but are moved to the cathode through an external circuit. Through these processes, electricity, water, and heat are generated.

In the course of undergoing the above process, some of the external air supplied to the stack participates in the reaction to generate electricity, and the other air not participating in the reaction is discharged through the second discharge pipe 13d together with the moisture generated at the time of generating the electricity. At this time, the non-reacted air containing a large quantity of moisture may be discharged to the second discharge pipe 13d of the stack 10 by the pumping power of the air pump 71.

According to the present embodiment, the non-reacted air discharged through the second discharge pipe 13d is supplied to the porous entrance 93a of the capillary channel 93 through a fourth supply line 84. At this time, the non-reacted air reaches the porous entrance 93a and is supplied to the first region A through the porous entrance 93a by the capillary action of the capillary channel 93.

In the capillary channel 93, since the passage of the second region B extending from the first region A is gradually expanded to the exit 93b side, the non-reacted air supplied to the first region A of the capillary channel 93 is naturally discharged from the first region A to the second region B due to the difference of the sectional area between the first region A and the second region B. At this time, since the non-reacted air has a high volume and/or maintains a high temperature, the non-reacted air can be discharged in the vaporized state.

In the course of undergoing the above process, a predetermined power source is applied the hot-wire 96 of the heater 95 to heat the main body 91 corresponding to the second region B of the capillary channel 93. As a result, it is possible to further accelerate the vaporization of the moisture contained in the non-reacted air passing through the second region B of the capillary channel due to the irradiated heat from the hot-wire 96.

The aforementioned vaporizing unit 90 can continuously supply the non-reacted air discharged from the second discharge pipe 13d of the stack 10 to the first region A, by the osmotic action resulting from the difference in concentration between the vaporized gas at the side of the exits 93b and the non-reacted air supplied to the first region A by the capillary action, and by the thermal expansion of the non-reacted air at the second region B. At this time, the flow rate of the non-reacted air supplied to the first region A may be controlled using the heat value of the heater 95.

Specifically, as the heat value of the heater 95 increases, the osmotic pressure increases, so that the flow rate of the non-reacted air increases. On the contrary, as the heat value of the heater 95 decreases, the osmotic pressure decreases, so that the flow rate of the non-reacted air decreases.

In view of the foregoing and according to the exemplary embodiment, the vaporized gas discharged through the exits 93b of the capillary channel 93 is discharged to the outside through the through-hole of the external case (not shown) in a state where it is not condensed.

In the fuel cell system according to certain embodiments of the present invention, since the system has a structure capable of vaporizing the non-reacted air to discharge the vaporized air to the outside, there is no need to provide an additional unit for storing or recycling water generated due to the air condensation. Therefore, it is possible to further enhance the efficiency and performance of the whole system by reducing the loss of heat or electric energy, and to make the size of the overall system compact.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A fuel cell system comprising:
   a stack for generating electric energy through an electrochemical reaction between hydrogen and oxygen;
   a fuel supply unit for supplying fuel to the stack;
   an air supply unit for supplying air to the stack; and
   a vaporizing unit connected with the stack,
   wherein the vaporizing unit comprises a main body and at least one capillary channel configured to vaporize moisture discharged from the stack in the main body, the at least one capillary channel comprising an entrance, an exit in communication with the entrance, a first region which is gradually narrowed from the entrance to the exit, and a second region extending from the first region which is gradually expanded from the first region to the exit.

2. The fuel cell system of claim 1, wherein the vaporizing unit comprises a porous member for absorbing the moisture by a capillary action.

3. The fuel cell system of claim 1, wherein the at least one capillary channel of the vaporizing unit comprises only one capillary channel.

4. The fuel cell system of claim 1, wherein the at least one capillary channel of the vaporizing unit comprises a plurality of capillary channels, and wherein the exits of the plurality of capillary channels form one grooved exit.

5. The fuel cell system of claim 4, wherein a portion of the main body in which the exits of the plurality of capillary channels are formed includes a groove for connecting the exits to form the one grooved exit.

6. The fuel cell system of claim 1, further comprising a heater connected with the main body for heating an area around the exit of the at least one capillary channel.

7. The fuel cell system of claim 6, wherein the heater is provided in the portion of the main body corresponding to the second region.

8. The fuel cell system of claim 1, further comprising a flow channel, wherein the stack and the vaporizing unit are connected to each other through the flow channel disposed therebetween.

9. The fuel cell system of claim 1, wherein the fuel supply unit comprises:
a fuel tank for storing liquid fuel; and
a fuel pump connected to the fuel tank.

10. The fuel cell system of claim 1, wherein the air supply unit comprises an air pump for sucking external air.

11. The fuel cell system of claim 1, further comprising a reformer for reforming the fuel supplied from the fuel supply unit to generate gas containing hydrogen, wherein the reformer is disposed between the fuel supply unit and the stack and is connected with the fuel supply unit and the stack.

12. The fuel cell system of claim 1, wherein the fuel cell system is a polymer electrolyte membrane fuel cell (PEMFC) system.

13. The fuel cell system of claim 1, wherein the fuel cell system is a direct methanol fuel cell (DMFC) system.

14. A vaporizing unit for vaporizing moisture discharged from a fuel cell system, the vaporizing unit comprising:
a main body; and
a capillary channel formed in the main body, the capillary channel having an entrance and an exit, the exit communicating with the entrance;
wherein the vaporizing unit is connected with a stack of the fuel cell system, and the capillary channel is configured to vaporize moisture discharged from the stack, and
wherein the capillary channel comprises a first region which is gradually narrowed from the entrance to the exit, and a second region extending from the first region which is gradually expanded from the first region to the exit.

15. The vaporizing unit of claim 14, further comprising a heater connected with the main body for heating an area around the exit of the capillary channel.

16. A fuel cell system comprising:
a stack for generating electric energy through an electrochemical reaction; and
a vaporizing unit connected with the stack, the vaporizing unit comprising:
a main body;
a plurality of capillary channels configured to vaporize moisture discharged from the stack formed in the main body, each of the capillary channels having an entrance, an exit, a first region which is gradually narrowed from the entrance to the exit, and a second region extending from the first region which is gradually expanded from the first region to the exit; and
a groove formed in the main body, the groove connecting the exits of the capillary channels within the main body.

17. The fuel cell system of claim 16, further comprising a heater connected with the main body for heating an area around the exits of the capillary channels.

* * * * *